United States Patent [19]

Arai et al.

[11] Patent Number: 4,717,175

[45] Date of Patent: Jan. 5, 1988

[54] STEER ANGLE ADJUSTING APPARATUS FOR VEHICLE

[75] Inventors: Noritoshi Arai; Chiharu Tamura, both of Toyota, Japan

[73] Assignee: Toyota Jidosha Kabushiki Kaisha, Toyota, Japan

[21] Appl. No.: 927,965

[22] Filed: Nov. 7, 1986

[30] Foreign Application Priority Data

Nov. 8, 1985 [JP] Japan .............................. 60-250278
Jan. 9, 1986 [JP] Japan .............................. 61-1324

[51] Int. Cl.⁴ .............................................. B62D 7/16
[52] U.S. Cl. ................................. 280/96.1; 180/141; 280/661; 280/673
[58] Field of Search ................ 280/96.1, 661, 673, 280/675, 701; 180/132, 140, 141

[56] References Cited

U.S. PATENT DOCUMENTS

| | | | |
|---|---|---|---|
| 4,236,728 | 12/1980 | Policy et al. | 280/661 |
| 4,519,627 | 5/1985 | Shibahata et al. | 280/701 |
| 4,545,602 | 10/1985 | Shibahata | 280/91 |
| 4,616,846 | 10/1986 | Furuya et al. | 280/673 |

Primary Examiner—John J. Love
Assistant Examiner—Kenneth R. Rice
Attorney, Agent, or Firm—Oblon, Fisher, Spivak, McClelland & Maier

[57] ABSTRACT

A steer angle adjusting apparatus for a vehicle is arranged such that the respective steer angles of right and left steered wheels of the vehicle which are steered by a steering device are adjusted independently of each other by a steer angle adjusting mechanism. A running condition of the vehicle is detected by running condition detectors, and the steer angle adjusting mechanism is controlled by a controller in accordance with the detected running condition. Accordingly, the steering stability is improved irrespective of the running condition of the vehicle.

20 Claims, 14 Drawing Figures

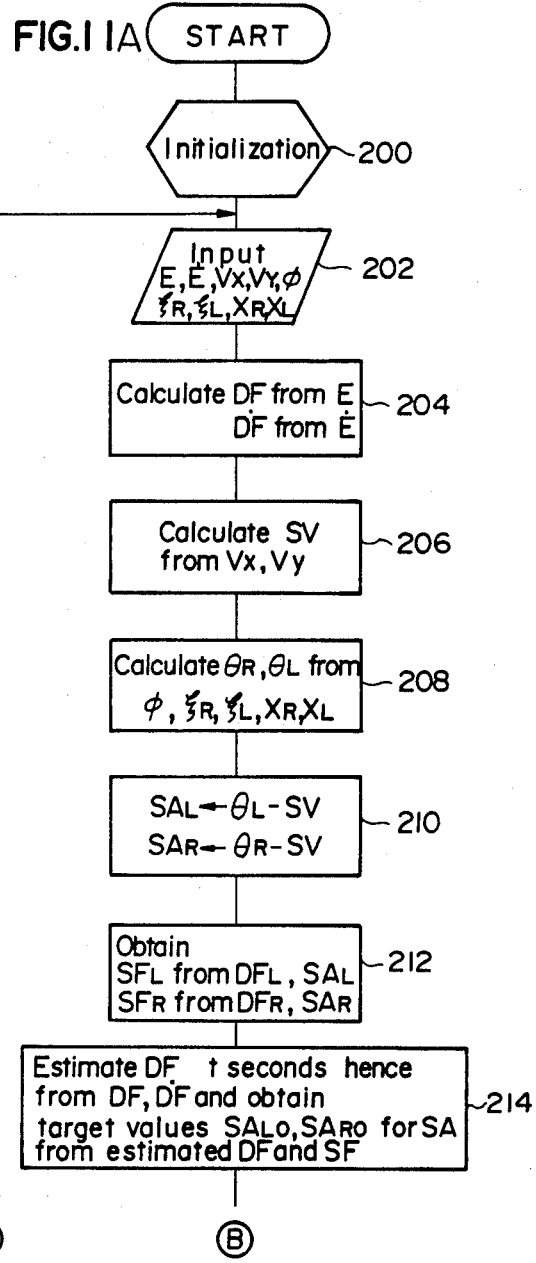

STEER ANGLE ADJUSTING APPARATUS FOR VEHICLE

BACKGROUND OF THE INVENTION

1. Field of the Invention

The present invention relates to a steer angle adjusting apparatus for a vehicle designed to adjust the steer angle of each of the right and left steered wheels of the vehicle in accordance with the vehicle running condition.

2. Description of the Related Art

In the Ackermann steering system, as shown in FIG. 13, the center O of turning of a left wheel 10L and that of a right wheel 10R are allowed to coincide with each other. Therefore, this steering system has the advantage that, when the vehicle is running at a relatively low speed, it can turn smoothly without any side slip of the wheels (see Japanese Patent Laid-Open No. 79758/1980).

In the parallel steering system, as shown in FIG. 12, the steer angle $\theta_i$ of an inner wheel and the steer angle $\theta_o$ of an outer wheel are allowed to coincide with each other. Therefore, when the vehicle is running at a relatively high speed, the difference between the slip angle of the left wheel 10L and that of the right wheel 10R is minimized and the cornering force is increased, so that the vehicle can turn smoothly.

Further, there has heretofore been one type of steer angle adjusting apparatus in which when the vehicle makes a turn, a steer angle which is proportional to a particular side slip angle of the rear wheels is given to them and at the same time, this steer angle is added to the steer angle of the front wheels. This conventional apparatus enables an improvement in the steering stability during high-speed running of the vehicle (see Japanese patent publication No. 10728/1965).

The above-described conventional systems suffer, however, from the following problems. Since the steer angles of the right and left steered wheels are unconditionally determined when the angle of steering rotation of the steering wheel is determined, it is possible to improve the steering stability only in a specific condition, which means that an adverse effect may be produced in conditions other than the specific one.

For example, the Ackermann steering system involves the problem that, when the vehicle makes a turn that is accompanied by a relatively large centrifugal force, the slip angle of the left wheel 10L, serving as an inner wheel, may be larger than an optimal value, resulting in an increase in the rate of wear of the tire, generation of tire skid noise and lowering of the steering stability.

In the parallel steering system, a slip angle may be generated when the vehicle turns at a relatively low speed, causing the steering wheel operability to be deteriorated.

In the above-described conventional steer angle adjusting apparatus, even when the vehicle turns at a relatively high speed, if the braking or driving force (hereinafter referred to as the "braking/driving force") is changed, the cornering force is also changed, and this leads to a change in the posture or attitude of the vehicle, disadvantageously.

SUMMARY OF THE INVENTION

In view of the above-described circumstances, it is a primary object of the present invention to provide a steer angle adjusting apparatus for a vehicle which is designed to enable an improvement in the steering stability irrespective of the running condition of the vehicle.

To this end, the present invention provides a steer angle adjusting apparatus for a vehicle, which comprises steer angle adjusting means capable of independently adjusting the respective steer angles of right and left steered wheels of the vehicle which are steered by steering means; running condition detecting means for detecting a running condition of the vehicle; and control means for controlling the steer angle adjusting means in accordance with the detected running condition.

By virtue of the above-described arrangement, the steer angle adjusting means is controlled by the control means in accordance with the vehicle running condition detected by the running condition detecting means, so that the respective steer angles of the right and left steered wheels steered by the steering means are adjusted independently of each other in addition to the steering operation of both the wheels by a steering wheel.

DESCRIPTION OF THE PREFERRED EMBODIMENTS

A first embodiment of the steer angle adjusting apparatus for a vehicle according to the present invention will first be described hereinunder with reference to FIGS. 1 to 6 and 12 to 14.

Figure 1:
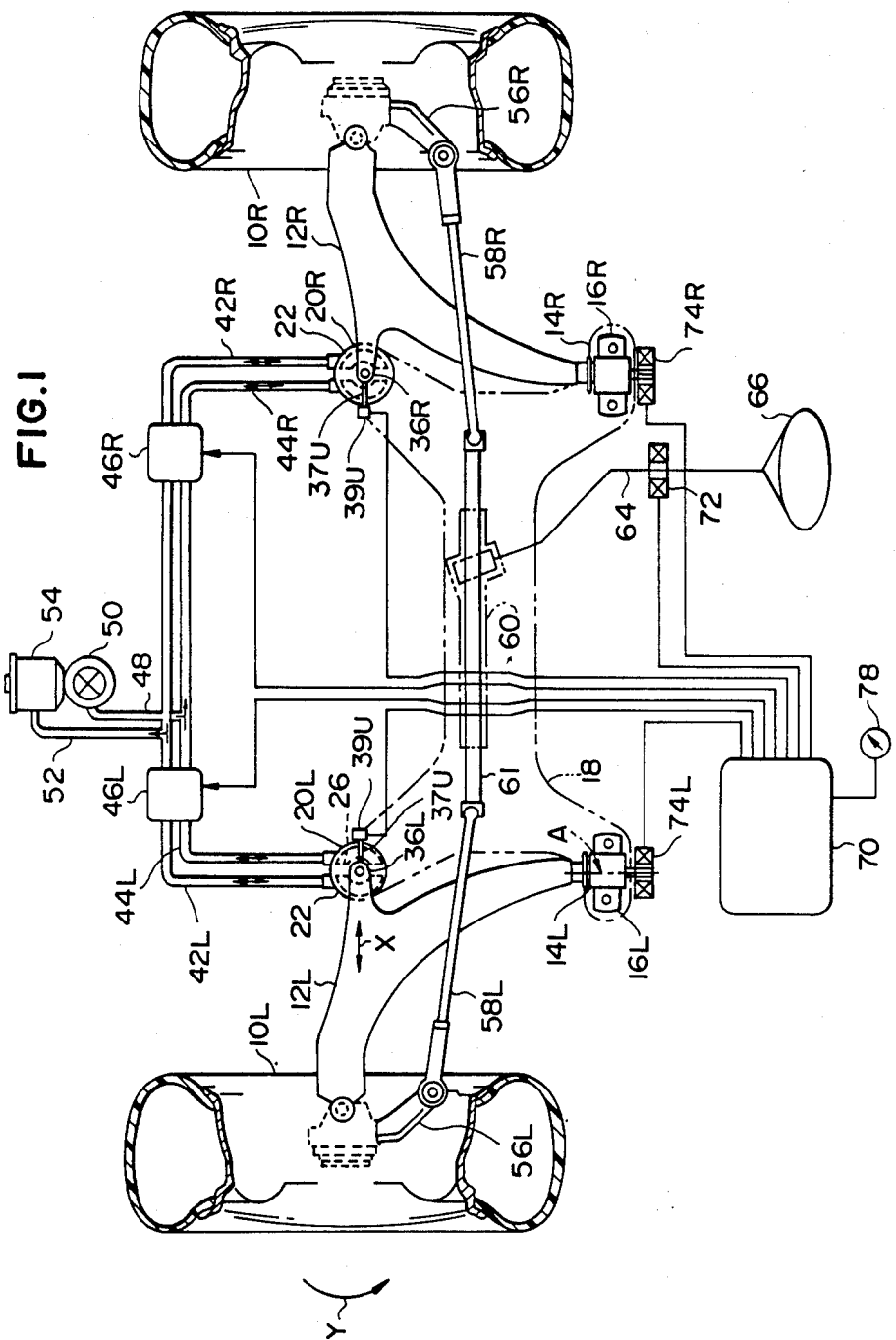
FIG. 1 shows the arrangement of a first embodiment of the steer angle adjusting apparatus for a vehicle according to the present invention.

FIG. 1 is a plan view of a steering system for the front wheels of a vehicle. A left wheel 10L is pivotally supported by one end portion of a lower arm 12L in such a manner as to be pivotal in the direction of the arrow Y about the pivot point. The other end portion of the lower arm 12L on the side thereof which is closer to the rear end of the vehicle is pivotally supported by a bracket 16L through a rubber bush 14L. The bracket 16L is rigidly secured to a left end portion of a cross member 18 on the side thereof which is closer to the rear end of the vehicle. The other side portion of the second end of the lower arm 12L, which is closer to the front end of the vehicle, is supported by a steer angle adjusting unit 20L. The unit 20L has a housing 22 which is rigidly secured to a portion of the left end of the cross member 18 on the side thereof which is closer to the front end of the vehicle.

Figure 2:
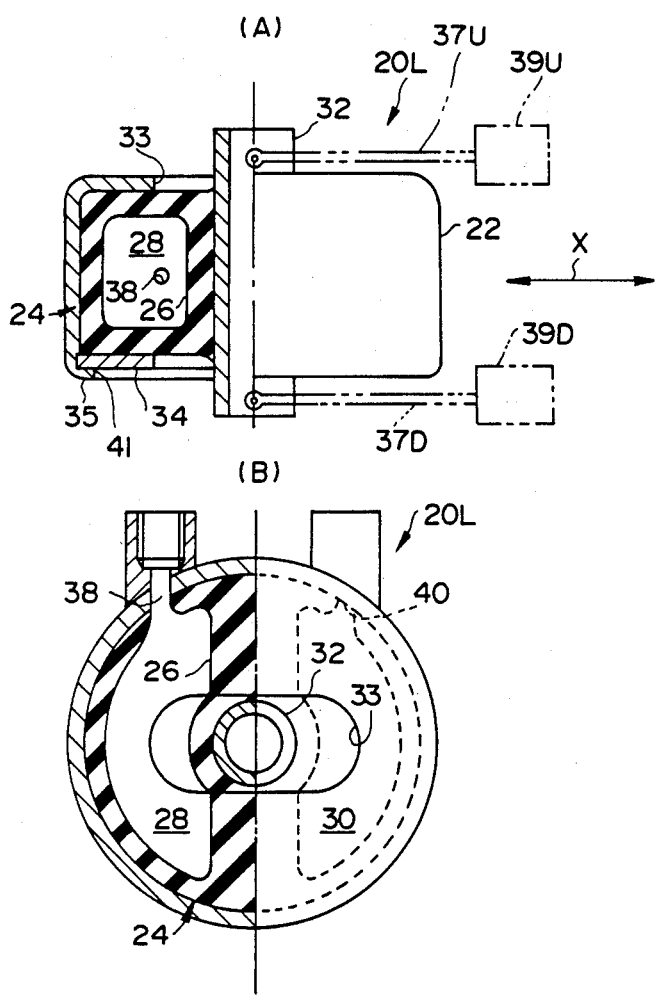
FIG. 2(A) is a partially-sectioned front view of one of the steer angle adjusting units shown in FIG. 1.
FIG. 2(B) is a partially-sectioned plan view of the steer angle adjusting unit shown in FIG. 2(A)

As shown in FIG. 2, a rubber bush 24 is fitted into the housing 22 of the steer angle adjusting unit 20L. The inside of the rubber bush 24 is divided in the lateral direction of the vehicle by a partition wall 26 to define liquid chambers 28 and 30. A pipe 32 extends through the central portion of the partition wall 26. A disc 34 is pressed against the lower surface of the rubber bush 24. A lower end portion 35 of the housing 22 is bent toward the axis thereof to secure the disc 34. The upper and lower end portions of the pipe 32 respectively project from an opening 33 formed in the upper surface of the housing 22 and an opening 41 formed in the lower surface thereof. As shown in FIG. 1, a bolt 36L extends through the pipe 32 to rigidly secure the lower arm 12L to the pipe 32. The housing 22 is rigidly secured to the lower arm 12L. The lower arm 12L is able to pivot about the axis A in the vertical direction of the vehicle by virtue of the elastic deformation of the rubber bush 24.

Bores 38 and 40 are provided in the peripheral surface of the housing 22. The bore 38 allows the liquid chamber 28 to communicate with a solenoid valve 46L through a pipe 42L, and the bore 40 allows the liquid chamber 30 to communicate with the solenoid valve 46L through a pipe 44L. The solenoid valve 46L is communicated with an oil-hydraulic pump 50 through a pipe 48 and also communicated with an oil tank 54 through a pipe 52.

Accordingly, when the oil pressurized by the pump 50 is fed into the liquid chamber 30 through the pipe 48, the solenoid valve 46L and the pipe 44L, the partition wall 26, together with the pipe 32, is moved leftward as viewed in FIG. 1, and the oil within the liquid chamber 28 is pushed out to the oil tank 54 through the pipe 42L, the solenoid valve 46L and the pipe 52. When the solenoid valve 46L is switched to feed the pressurized oil into the liquid chamber 28, the partition wall 26 is moved in the direction counter to the above.

Arms 37U and 37D are pivotally supported by the upper and lower end portions, respectively, of the pipe 32. The amounts of movement of the arms 37U and 37D in the direction of the arrow X shown in FIG. 2(A) are detected by displacement sensors 39U and 39D, respectively. Each of the displacement sensors 39U and 39D is adapted to detect a change in resistance, a change in impedance of a coil or the like using, e.g., a potentiometer.

The left wheel 10L is operatively connected to a steering gear box 60 through a knuckle arm 56L and a tie rod 58L. The steering gear box 60 is provided with a rack bar 61 formed with a rack. The rack bar 61 is activated to move sideward as viewed in FIG. 1 by means of a pinion 63 which is meshed with the rack. The pinion 63 is rotated by means of the rotational force transmitted thereto from a steering column shaft 64. A steering wheel 66 is provided on the upper end of the shaft 64.

The arrangement of a right wheel 10R and its associated elements is similar to that of the left wheel 10L and its associated elements. Therefore, the same portions or members as those on the left wheel side are denoted by the same reference numerals, and R is suffixed thereto in place of L.

When the rack bar 61 in the steering gear box 60 is moved in the direction of the arrow X, the left wheel 10L is pivoted in the direction of the arrow Y. When the lower arm 12L pivots about the axis A in the vertical direction of the vehicle, the left wheel 10L slightly pivots in the direction of the arrow Y. When the pivot point of the lower arm 12L on the side thereof which is closer to the front end of the vehicle is moved in the direction of the X by means of the steer angle adjusting unit 20L, the left wheel 10L slightly pivots in the direction of the arrow Y.

The adjustment of the steer angle effected by the steer angle adjusting unit 20L is controlled by a microcomputer 70. The amounts by which the steer angles of the left and right wheels 10L and 10R are to be adjusted by the units 20L and 20R are calculated on the basis of data read off from rotational angle sensors 72, 74L and 74R. This calculating operation will be explained below.

The amount of rotation of the steering column shaft 64, that is, the amount of movement of the rack bar 61 in the lateral direction of the vehicle, is detected by the column shaft rotational angle sensor 72 and supplied to the microcomputer 70. On the basis of the detected data, the microcomputer 70 calculates a steer angle (generated by turning the steering wheel 66) of the left wheel 10L at the time when the lower arm 12L and the steer angle adjusting unit 20L are in their neutral positions, that is, a steer angle $\theta_s$ before the correction (described later) is made.

The angle $\phi$ of pivotal motion of the lower arm 12L about the axis A is detected by the lower arm rotational angle sensor 74L and supplied to the microcomputer 70. On the basis of the detected data, the microcomputer 70 calculates a correction quantity for the steer angle of the left wheel 10L at the time when the steer angle adjusting unit 20L is in its neutral position. This correction quantity can be approximated with, for example, a linear or quadratic equation for the angle $\phi$ of pivotal motion.

The rotational angle sensors 72, 74L and 74R may be constituted by rotary encoders or potentiometers.

The steer angle correction quantity needed to effect steer angle correction in the steer angle adjusting unit 20L is calculated in the way described below. The amounts $x_1$ and $x_2$ of movement of the arms 37U and 37D in the direction of the arrow X are detected by the displacement sensors 39U and 39D, respectively, and supplied to the microcomputer 70. The microcomputer 70 then calculates an amount of movement of the lower arm 12L in the lateral direction of the vehicle, that is, a mean value x of $x_1$ and $x_2$. For example, when the lower arm 12L pivots only in the vertical direction of the vehicle and there is no displacement of the arm 12L in the lateral direction of the vehicle which would otherwise be caused by side force, the condition of $x_1 = -x_2$ holds, and the amount x of movement of the lower arm 12L in the lateral direction of the vehicle is 0. On the basis of this amount x, a steer angle correction quantity is calculated. The correction quantity can be approximated with, for example, a linear or quadratic equation for x.

Accordingly, an accurate steer angle $\theta$ may be calculated from, for example, the following equation:

$$\theta = \theta_s + A\phi + B\phi^2 + Cx + Dx^2 + E$$

A, B, C, D and E in this equation can be approximated with a linear or quadratic equation for $\theta_s$.

Optimization of steer angles will be explained below with reference to FIGS. 5 and 6.

Figure 5:
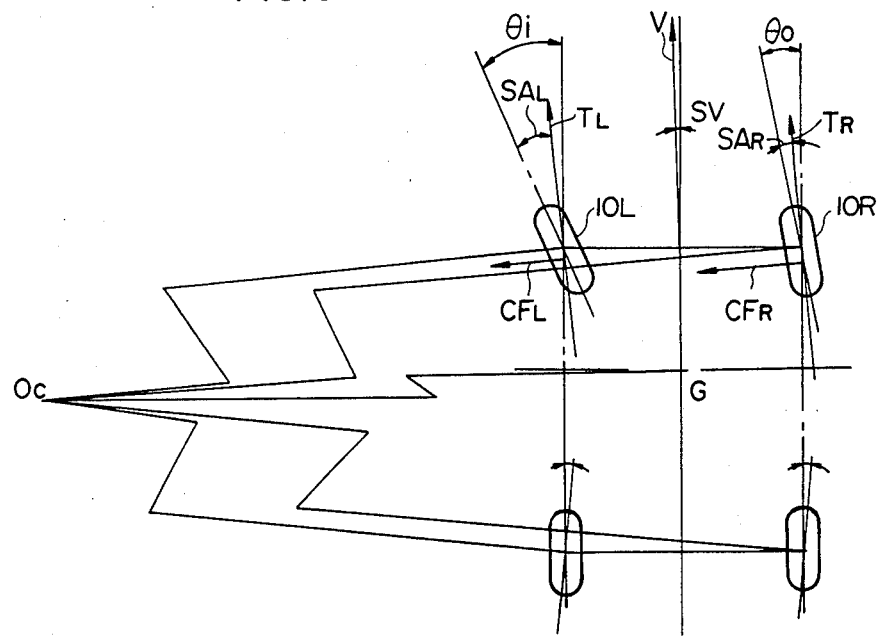
FIG. 5 is view employed to describe the relationship between steer angles, slip angles, etc.
Figure 6:
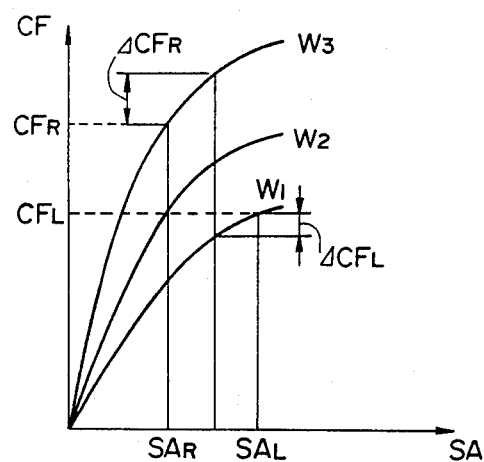
FIG. 6 is a graph showing the relationship between the slip angle and the cornering force using the load applied to a wheel as a parameter.

FIG. 5 schematically shows the four wheels of the vehicle in the case where the steer angles are not adjusted by the steer angle adjusting units 20L and 20R (in the Ackermann mode in this embodiment). In the drawing, the reference symbol TL denotes the direction of progress, or course, of the left wheel 10L, TR the course of the right wheel 10R, V the course of the vehicle body, and G the center of gravity of the vehicle. Further, $\theta_i$ and $\theta_o$ respectively denote the inner and outer wheel steer angles, and $SA_L$ and $SA_R$ respectively denote the slip angles of the left and right wheels 10L and 10R. In addition, $CF_L$ and $CF_R$ denote the cornering forces acting on the left and right wheels 10L and 10R, respectively.

The relationship between the two slip angles $SA_L$ and $SA_R$ is $SA_L > SA_R$, whereas the relationship between the two cornering forces $CF_L$ and $CF_R$ is $CF_L < CF_R$. This is because the load $W_3$ applied to the right wheel 10R is larger than the load $W_1$ applied to the left wheel 10L. The relationship between the slip angle and the cornering force is shown in FIG. 6. In FIG. 5, if the condition of $SA_R = SA_L$ is satisfied by decreasing $\theta_i$ and increasing $\theta_o$, $CF_R$ increases, and $CF_L$ decreases as will be clear from FIG. 6. Since the increment $\Delta CF_R$ of $CF_R$ is larger than the decrement $\Delta CF_L$ of $CF_L$, the sum of $CF_R$ and $CF_L$ increases by $\Delta CF_R - \Delta CF_L$.

Figure 12:
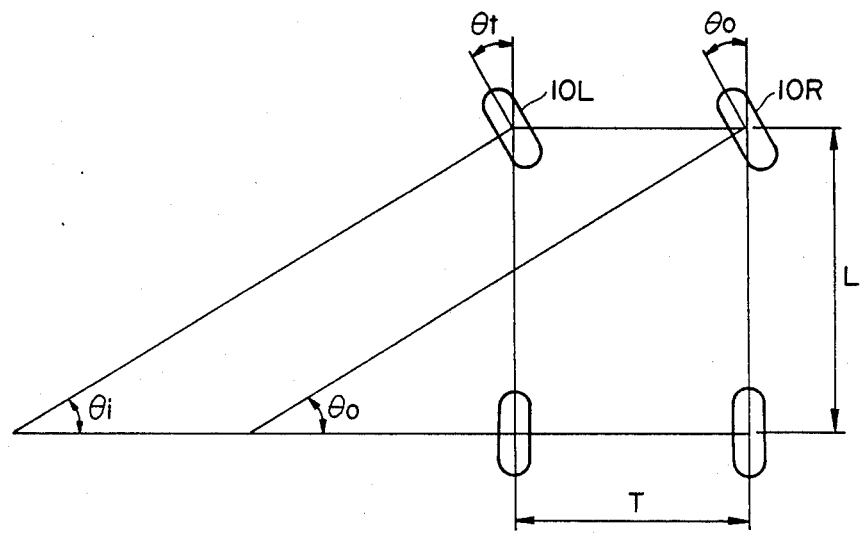
FIG. 12 is a view employed to describe the parallel steering system.
Figure 13:
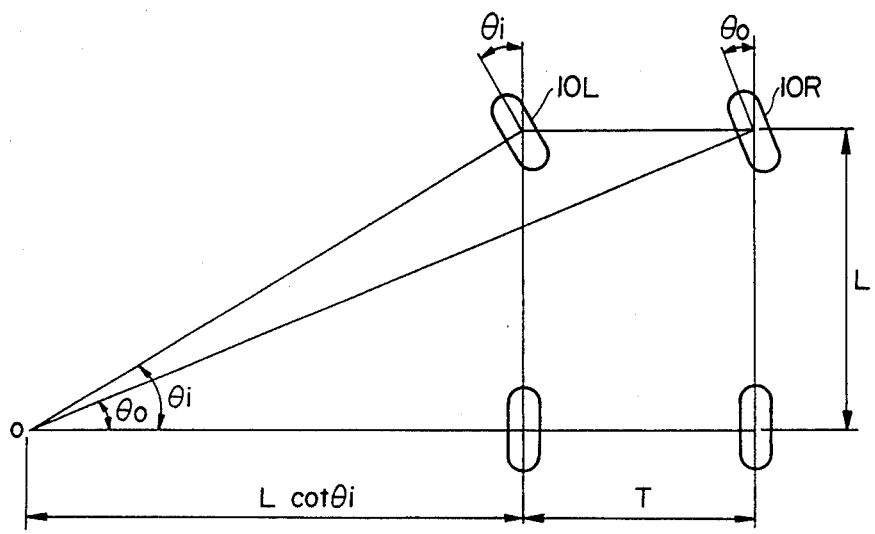
FIG. 13 is a view employed to describe the Ackermann steering system.

If the wheels are steered in the Ackermann steering mode as shown in FIG. 13 during the low-speed running of the vehicle and in the parallel steering mode as shown in FIG. 12 during the high-speed running, the difference between $SA_R$ and $SA_L$ decreases, and the sum of $CF_R$ and $CF_L$ increases. This is quantitatively shown in FIG. 3. More specifically, if the value of the steer angle ratio $\alpha$ is made coincident with its target value $\alpha_0$ in accordance with the vehicle speed V and the means steer angle $(\theta_i + \theta_o)/2$, the difference between $SA_R$ and $SA_L$ decreases and the sum of $CF_R$ and $CF_L$ increases.

The steer angle ratio $\alpha$ may be represented by the following equation:

$$\alpha = (\theta_i - \theta_o)/(\theta_i - \theta)$$

where $$\theta = \tan^{-1}\{L/(T + L\cot\theta_i)\}$$

Figure 3:
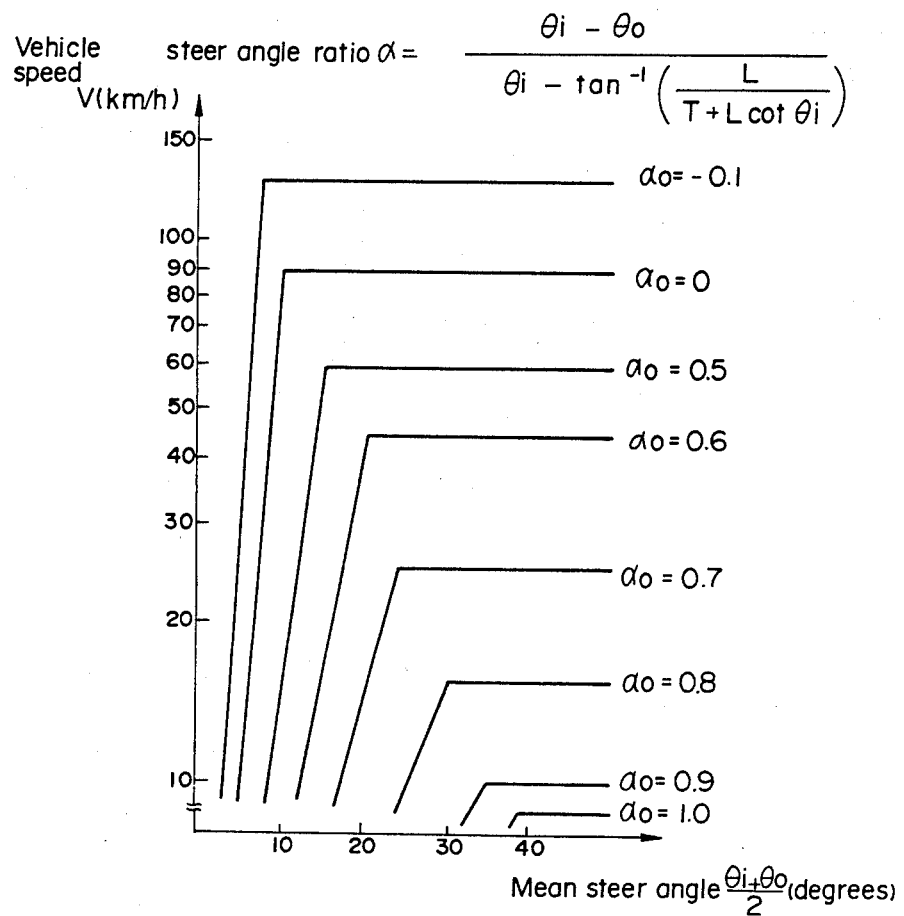
FIG. 3 is a graph employed to obtain a target value for the steer angle ratio from a vehicle speed and a mean steer angle.

L: the distance between the front and rear wheels
T: the distance between the left and right wheels In the case of the Ackermann steering mode shown in FIG. 13, $\theta = \theta_o$; therefore, $\alpha = 1$. In the case of the parallel steering mode shown in FIG. 12, $\theta_i = \theta_o$; therefore, $\alpha = 0$. As shown in FIG. 3, there are cases where the value of $\alpha$ is negative or 1 or more.

Figure 14:
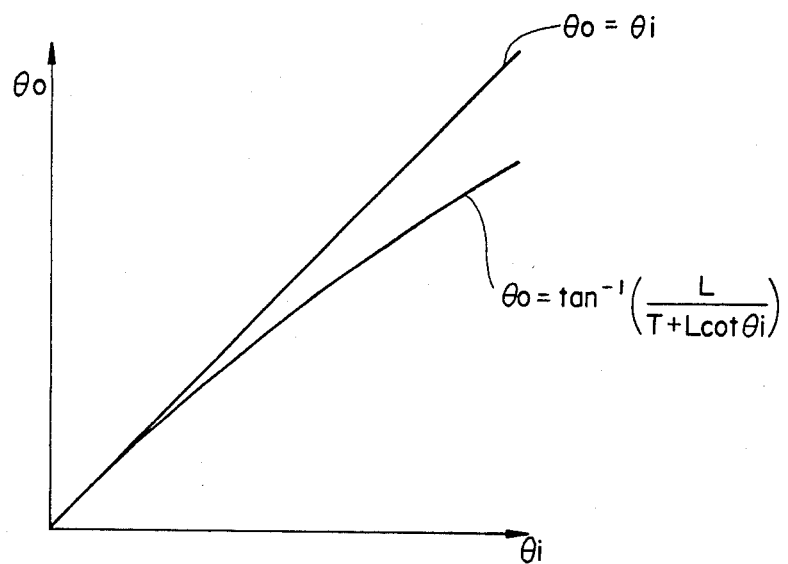
FIG. 14 is a graph showing the relationship between the steer angle of an inner wheel and the steer angle of an outer wheel in each of the parallel and Ackermann steering systems.

FIG. 14 shows the relationship between $\theta_i$ and $\theta_o$ in each of the Ackermann and parallel steering systems. In this embodiment, the values of $\theta_i$ and $\theta_o$ in a region which is intermediate between the two curves in FIG. 14 or in the periphery thereof are taken in accordance with both the vehicle speed V and the mean steer angle $(\theta_i + \theta_o)/2$.

Figure 4:
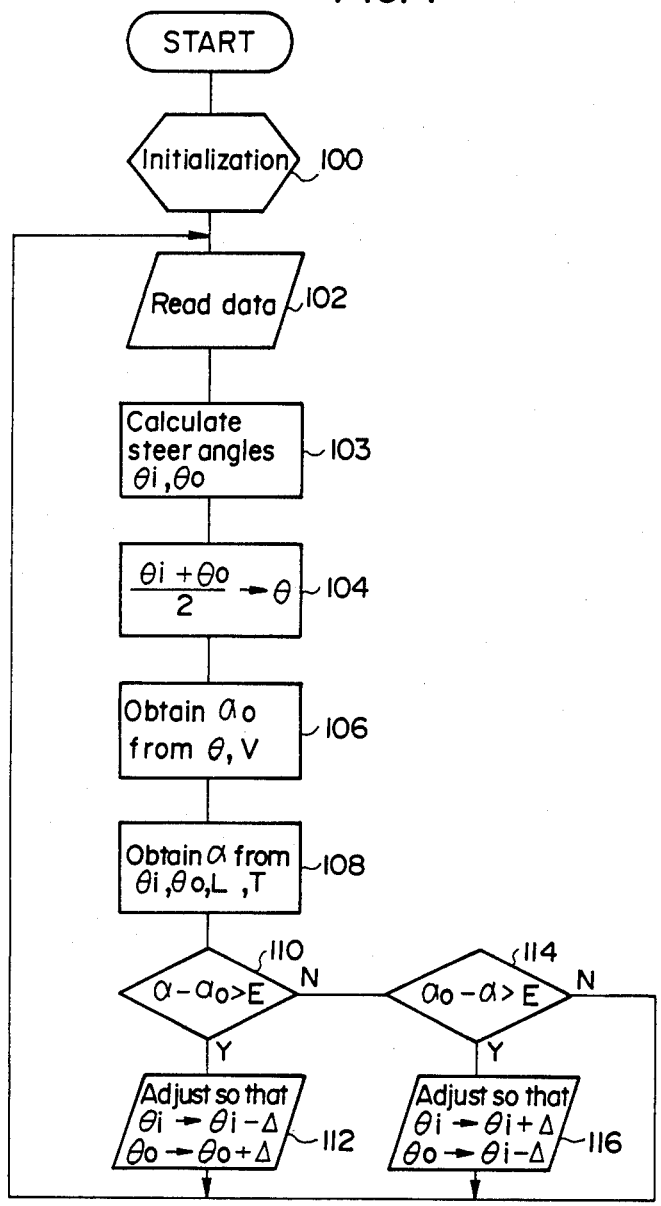
FIG. 4 is a control flowchart showing the operation of the first embodiment.

The following is a description of the operation of the first embodiment with reference to the flowchart shown in FIG. 4.

When the igniition switch is turned on, the program is started, and the quantities by which the steer angles are to be adjusted by the steer angle adjusting units 20L and 20R are zeroized in Step 100. In other words, the Ackermann steering mode is set in this embodiment. Then, the process proceeds to Step 102, in which a vehicle speed V is read from the vehicle speed sensor 78, and data items from the column shaft rotational angle sensor 72, the lower arm rotational angle sensors 74L, 74R and the displacement sensors 39U, 39D are also read. Then, the process proceeds to Step 103, in which steer angles $\theta_i$ and $\theta_o$ are calculated using these read data items as described above. The process then proceeds to Step 104, in which a mean steer angle $\theta = (\theta_i + \theta_o)/2$ is calculated.

A target value $\alpha_0$ for the steer angle ratio is obtained in Step 106 from the values of $\theta$ and V using the relationship shown in FIG. 3 which has been stored in the form of a table in a ROM incorporated in the microcomputer 70. The process then proceeds to Step 108, in which the value of the steer angle ratio $\alpha$ is calculated from the values of $\theta_i$, $\theta_o$, L and T.

Then, the process proceeds to Step 110, and if the value of $(\alpha - \alpha_0)$ is larger than a relatively small positive value $\epsilon$, the steer angle adjusting units 20L and 20R are activated in Step 112 so that $\theta_i$ becomes $\theta_i - \Delta$ and $\theta_o$ becomes $\theta_o + \Delta$. It should be noted here that $\Delta$ is a relatively small positive value. If $\alpha_0 - \alpha > \epsilon$ (step 114), the steer angle adjusting units 20L and 20R are activated so that $\theta_i$ becomes $\theta_i + \Delta$ and $\theta_o$ becomes $\theta_o - \Delta$. When the processing in Step 112 or 116 is completed, or when the condition of $|\alpha - \alpha_0| < \epsilon_0$ is met, the process returns to Step 102, and the above-described processing is repeated.

In this way, feedback control is effected so that the steer angle ratio $\alpha$ approaches the target value $\alpha_0$.

The arrangement may be such that each steer angle adjusting unit is provided on a parallel steering system or a steering system which is intermediate between the parallel and Ackermann steering systems to adjust the steer angle.

Further, target values for $\theta_i$ abd $\theta_o$ may be calculated directly from V and $\theta$ without obtaining $\alpha$ and $\alpha_0$.

A second embodiment of the present invention will next be described with reference to FIGS. 7 to 11.

Figure 7:
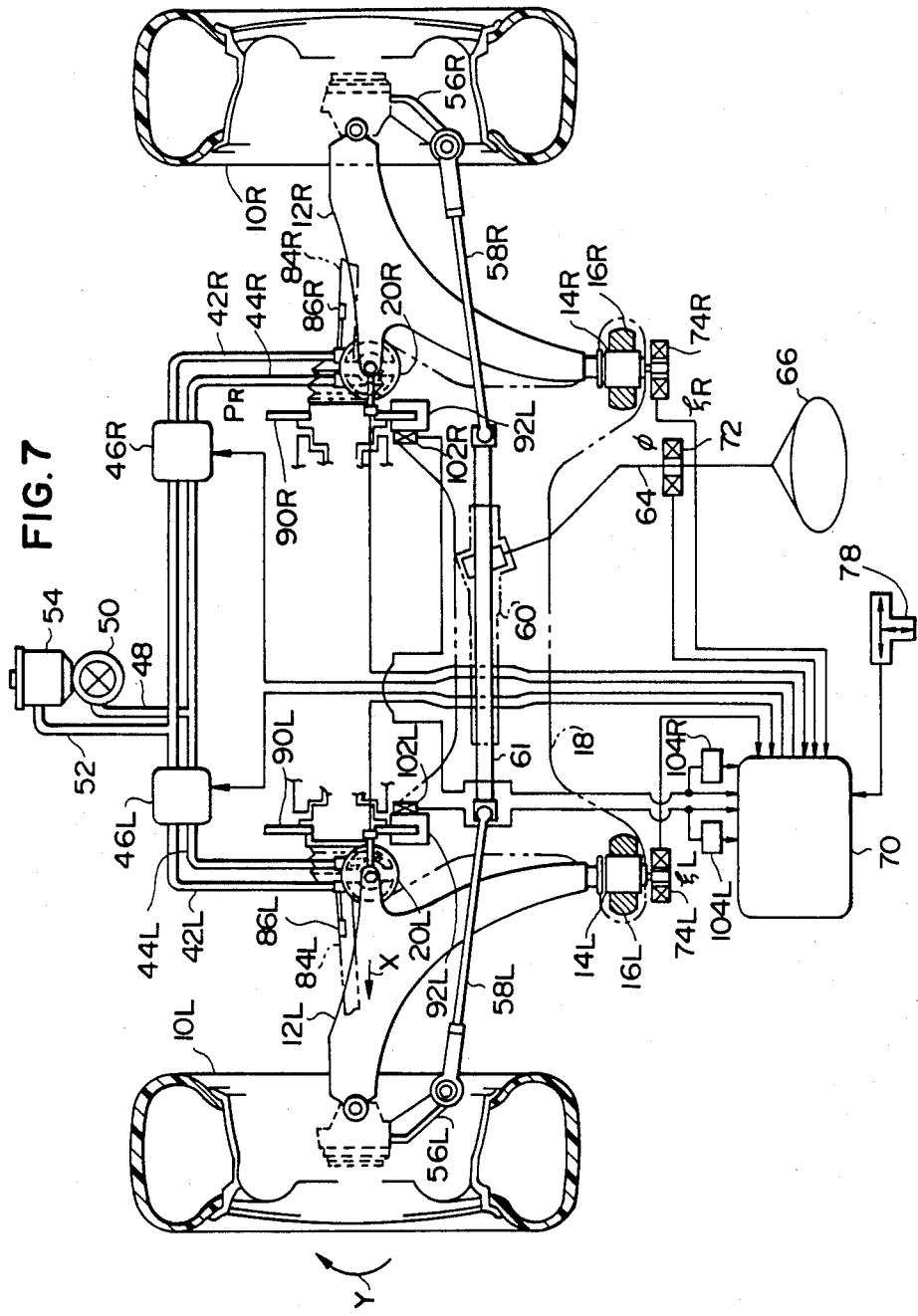
FIG. 7 shows the arrangement of a second embodiment of the present invention.

FIG. 7 is a plan view of a steering system for the front wheels of a vehicle in accordance with the second embodiment of the present invention. In the drawing, the same elements or portions as those shown in FIG. 1 are denoted by the same reference numerals.

Unlike the first embodiment, the second embodiment has a vehicle speed sensor 78 defined by an image sensor which enables detection of a component Vx of a vehicle speed V in the longitudinal direction of the vehicle and a vehicle speed component Vy in the lateral direction of the vehicle from a change of roughness of a road surface with time.

Figure 9:
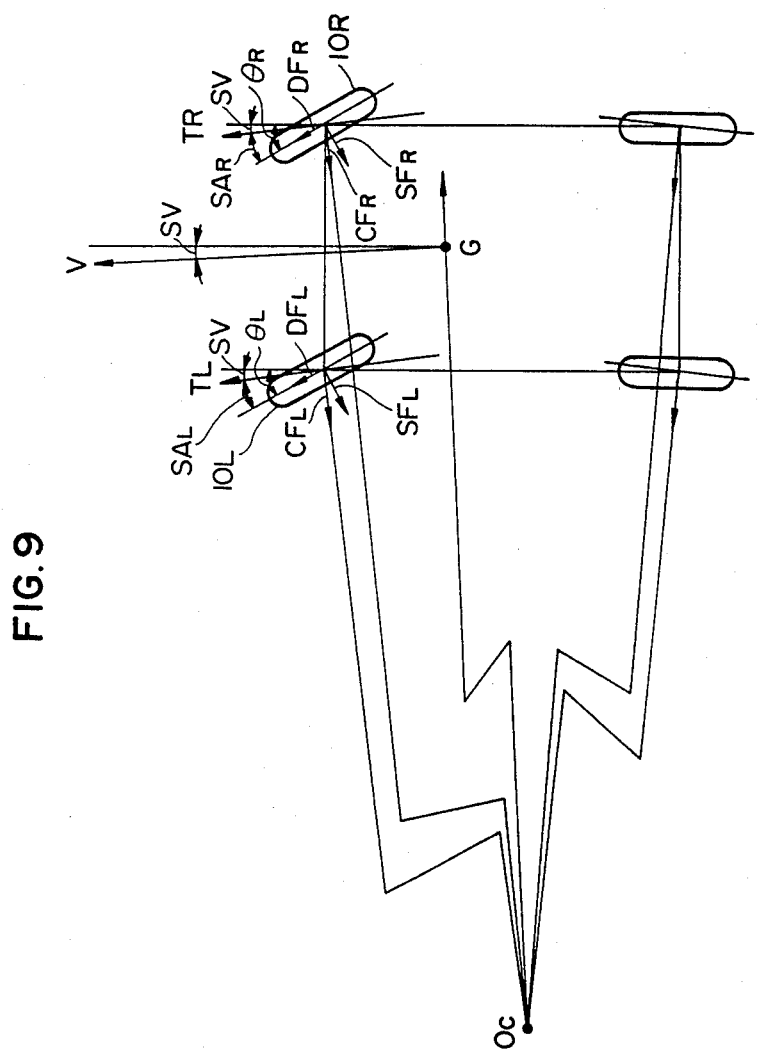
FIG. 9 is a view employed to describe the relationship between steer angles, slip angles, side slip angles, etc.

The side slip angle SV shown in FIG. 9 is obtained from the following equation:

$$SV = \tan^{-1}(Vy/Vx) \ldots \quad (1)$$

The respective slip angles $SA_L$, $SA_R$ of the left (inner) and right (outer) wheels 10L and 10R are obtained from the following equation:

$$SA_L = \theta_L - SV \ldots \quad (2)$$

$$SA_R = \theta_R - SV \ldots \quad (3)$$

Figure 8:
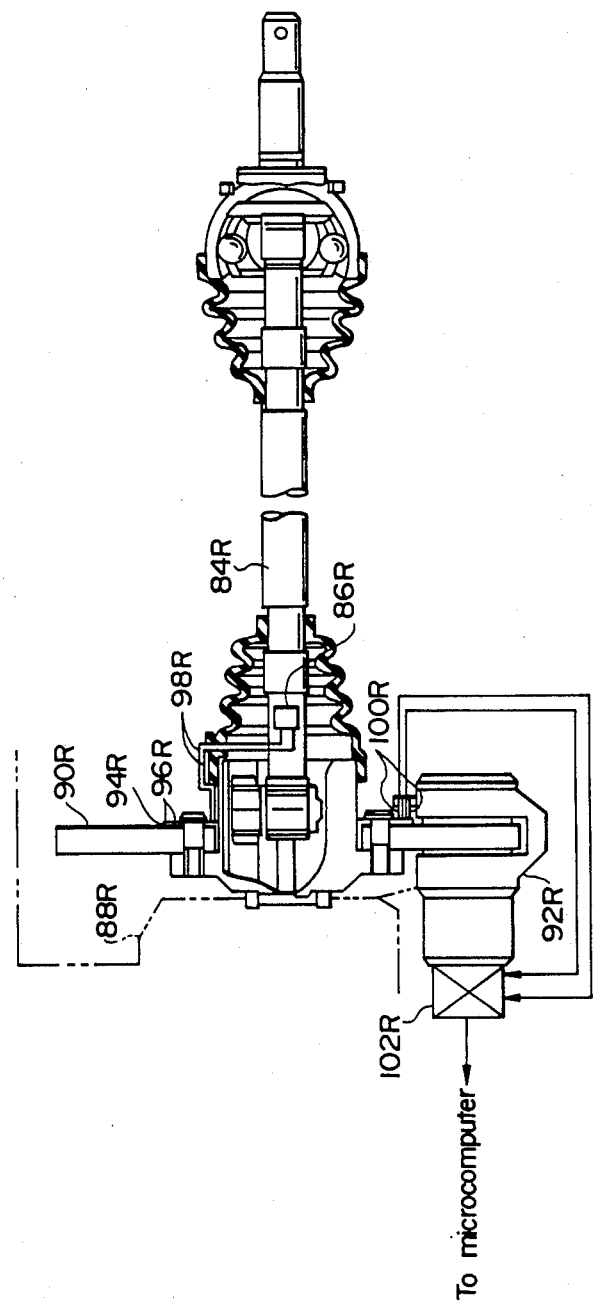
FIG. 8 shows the arrangement of the braking/driving force detecting unit shown in FIG. 7.

Detection of the driving force DF will be explained below. As shown in FIG. 8, a strain gage 86R is stuck to the peripheral surface of a drive shaft 84R. A differential gear casing 88R is provided at the proximal end of the drive shaft 84R. A disc rotor 90R is attached to a portion of the drive shaft 84R which extends between the strain gage 86R and the differential gear casing 88R. A disc brake caliper 92R is provided on the differential gear casing 88R in such a manner as to be able to clamp the disc rotor 90R, thus enabling the disc rotor 90R to be braked. A disc 94R is rigidly secured to one end face of the disc rotor 90R. The disc 94R is provided with two ring-shaped grooves 96R. An electrically conductive layer is deposited in each of the grooves 96R. The grooves 96R and the strain gage 86R are electrically connected by lead wires 98R, respectively. Two brushes 100R are provided on the disc brake caliper 92R in such a manner that the distal end portions of the brushes 100R are in slide contact with the electrically conductive layers provided in the grooves 96R, respectively.

Accordingly, the strain gage 86R and the brushes 100R are electrically connected.

The brushes 100R are electrically connected to a braking/driving force detecting unit 102R which is rigidly secured to the disc brake caliper 92R. The unit 102R incorporates a bridge circuit in which the strain gage 86 is incorporated and an amplifier for amplifying an unbalanced voltage. The amplified unbalanced voltage is supplied to the microcomputer 70. A signal which is differentiated by a differentiator 104R is also supplied to the microcomputer 70.

Accordingly, the microcomputer 70 can read a strain generated in the drive shaft 84R which corresponds to a driving force generated when the right wheel 10R is activated to rotate by the engine. The microcomputer 70 can also read a strain in the drive shaft 84R which corresponds to a braking force generated when the disc rotor 90R is braked by the disc brake caliper 92R. Further, the microcomputer 70 can read a rate of change of the strain with time.

Since the strain gage 86R is provided on a portion of the drive shaft 84R between the right wheel 10R and the disc rotor 90R, driving and braking forces are opposite to each other in terms of the direction of the strain generated in the drive shaft 84R and therefore can be distinguished from each other. The microcomputer 70 can obtain a rate $\dot{DF}$ of change of the driving force DF from the strain $\epsilon$ and the rate $\dot{\epsilon}$ of change of the strain. In the second embodiment, both the driving and braking forces are represented by the driving force DF, i.e., when DF is positive, it represents a driving force, whereas, when DF is negative, it represents a braking force.

The optimization of the steer angles in accordance with this embodiment will be explained below with reference to FIGS. 9 and 10.

In FIG. 9, the reference symbol TL denotes the direction of progress, or course, of the left wheel 10L, TR the course of the right wheel 10R, V the course of the vehicle body, G the center of gravity of the vehicle, and $O_C$ the center of turning. Further, $CF_L$ and $CF_R$ respectively denote the cornering forces acting on the left and right wheels 10L, 10R, and $SF_L$ and $SF_R$ respectively denote the side forces acting on the left and right wheels 10L, 10R.

Figure 10:
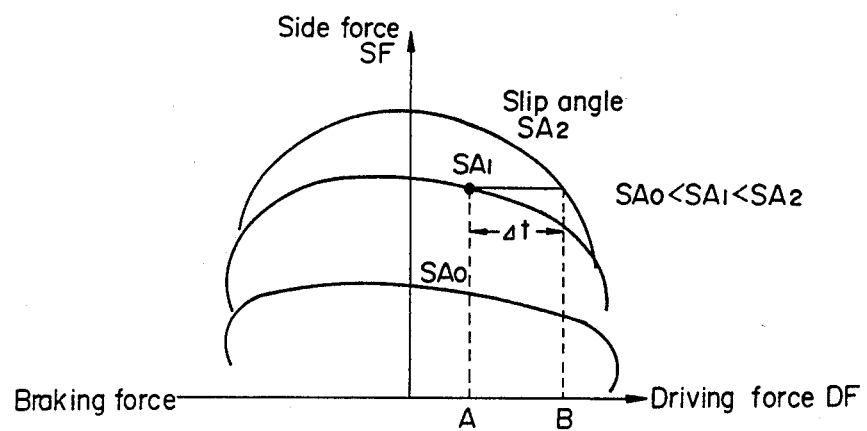
FIG. 10 is a graph showing the relationnship between the driving force and the side force using the slip angle as a parameter.

FIG. 10 shows the relationship between the driving force DF and the side force SF using the slip angle SA as a parameter. As will be clear from the graph shown in FIG. 10, when the absolute value of the driving force DF is increased with the side force SF maintained in a state wherein it is not affected by any other factor, the side force SF decreases. When the driving force DF is A and the slip angle SA is $SA_1$, it is necessary, in order to increase the driving force DF to B instantaneously (stepwisely) and yet to maintain the side force SF at a constant level, to increase the slip angle SA to $SA_2$. If, in this case, the slip angle SA is not changed, the radius of circle of turning increases to lead to a change in the attitude of the vehicle.

In the second embodiment, the value of the side force SF is obtained from both the driving force DF and the slip angle SA, and the value of the driving force DF $\Delta t$ seconds hence is estimated from the rate $\dot{DF}$ of change of the driving force DF. Then, the value of the slip angle SA $\Delta t$ seconds hence is obtained as a target value from both the estimated value of the driving force DF and the obtained value of the side force SF, thereby adjusting the slip angle SA and hence the steer angle $\theta$.

Figure 11B:
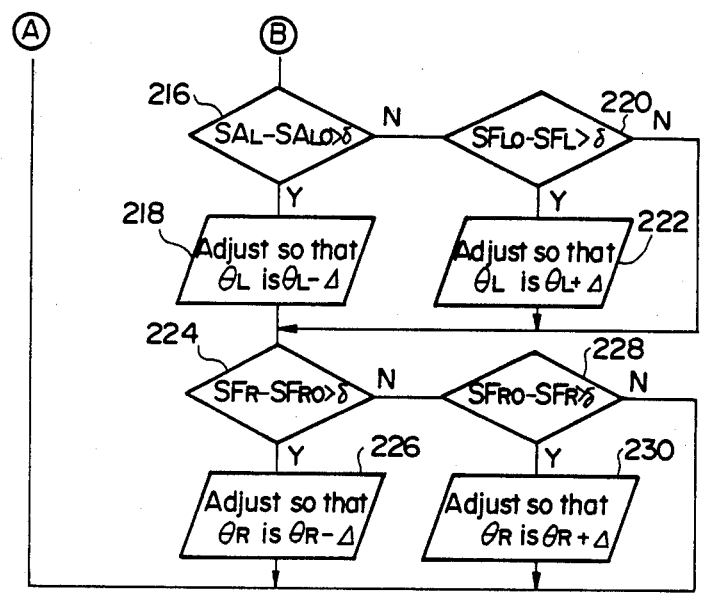
FIG. 11 is a flowchart showing the control effected by the microcomputer shown in FIG. 7.

The operation of the second embodiment will be explained below with reference to the flowchart shown in FIG. 11.

When the ignition switch is turned on, the program is started, and quantities by which the steer angles are to be adjusted by the steer angle adjusting units 20L and 20R are zeroized in Step 200. The process then proceeds to Step 202, in which data is read from each input device. Then, the process proceeds to Step 204, in which the driving force DF is calculated from the strain $\epsilon$, and the rate $\dot{DF}$ of change of the driving force DF is calculated from the rate $\dot{\epsilon}$ of change of the strain $\epsilon$. Then, the side slip angle SV is calculated in Step 206 from the vehicle speed components Vx and Vy in accordance with the equation (1). The process then proceeds to Step 208, in which the steer angles $\theta_R$ and $\theta_L$ are calculated in the above-described way from the lower arm rotational angle $\phi$, the steer angles $\xi_R$, $\xi_L$ detected by the column shaft rotational angle sensor 72 and the displacement amounts $x_R$, $x_L$ detected by the displacement sensors. Then, the process proceeds to Step 210, in which the slip angles $SA_L$ and $SA_R$ are calculated in accordance with the equations (2) and (3), respectively. The process then proceeds to Step 212, in which trhe side force $SF_L$ is obtained from both the driving force $DF_L$ and the slip angle $SA_L$ and from the relationship shown in FIG. 10, and the side force $SF_R$ is also obtained from both the driving force $DF_R$ and the slip angle $SA_R$. Then, the process proceeds to Step 214, in which the driving force DF $\Delta t$ seconds hence is estimated from the driving force DF and the rate $\dot{DF}$ of change of it, and target values $SA_{L0}$ and $SF_{R0}$ for the slip angle SA are obtained from both the estimated driving force DF and the obtained side force SF. If the absolute values of the differences between these target values and $SA_L$, $SF_R$ are less than δ, respectively, the process proceeds through Steps 216, 220, 224 and 228 to return to Step 202, from which the above-described processing is repeated. If $SA_L$-$SA_{L0}$>δ, the process proceeds from Step 216 to Step 218, in which the solenoid valve 46L is controlled to adjust the steer angle so that $\theta_L$ becomes $\theta_L-\Delta$. If $SF_{L0}-SF_L$>δ, the process proceeds from Step 220 to Step 222, in which the solenoid valve 46L is controlled to adjust the steer angle so that $\theta_L$ becomes $\theta_L+\Delta$. As to the right wheel 10R, processing similar to that in the case of the left wheel 10L is executed in Steps 224 to 230.

Thus, the steer angles are adjusted so that any change in the driving force DF will not change the attitude of the vehicle.

As has been described above, the steer angle adjusting apparatus for a vehicle according to the present invention is arranged such that the steer angle adjusting means is controlled by the control means in accordance with a vehicle running condition detected by the running condition detecting means, and the respective steer angles of the right and left steered wheels of the vehicle which are steered by the steering means are adjusted independently of each other. Accordingly, the steer angles of the right and left steered wheels are not unconditionally determined by the angle of steering rotation of the steering wheel but are adjusted in accordance with the running condition of the vehicle. Thus, it is advantageously possible to improve the steering stability.

Although the present invention has been described through specific terms, it should be noted here that the described embodiments are not necessarily exclusive and various changes and modifications may be imparted thereto without departing from the scope of the invention which is limited solely by the appended claims.

What is claimed is:

1. A steer angle adjusting apparatus for a vehicle, comprising:
    steer angle adjusting means capable of independently adjusting the respective steer angles of right and left wheels of the vehicle in addition to steering operation of both the wheels by a steering wheel;
    running condition detecting means for detecting a running condition of the vehicle; and
    control means for controlling said steer angle adjusting means in accordance with the detected running condition.

2. A steer angle adjusting apparatus according to claim 1, wherein said control means comprises:
    means for determining the difference between the respective slip angles of said right and left steered wheels; and
    means for controlling said steer angle adjusting means to adjust the steered angles of said right and left steered wheels and for minimizing the difference determined by said determining means.

3. A steer angle adjusting apparatus according to claim 1, wherein said control means comprises:
    means for determining the sum of the respective steer angles of said right and left steered wheels; and
    means for controlling said steer angle adjusting means to adjust the steered angles of said right and left steered wheels and for equalizing the sum determined by said determining means and the sum of the steer angles of said right and left steered wheels after the adjustment.

4. A steer angle adjusting apparatus according to claim 3, wherein said running condition detecting means includes a vehicle speed sensor for detecting a vehicle speed and a steer angle sensor for detecting a steer angle of each of said steered wheels.

5. A steer angle adjusting apparatus according to claim 4, wherein said steer angle sensor includes a steering wheel rotational angle sensor, lower arm rotational angle detecting means, and steer angle adjustment quantity detecting means for detecting a quantity by which a steer angle is adjusted by said steer angle adjusting means.

6. A steer angle adjusting apparatus according to claim 5, wherein said steer angle adjusting means is adapted to cause at least one support point of a lower arm supported by the vehicle body at two points spaced apart from each other in the longitudinal direction of the vehicle to move in the substantially lateral direction of the vehicle.

7. A steer angle adjusting apparatus according to claim 1, wherein said control means controls said steer angle adjusting means in correspondence with a change in the running condition during turning of the vehicle so that the change in attitude of the vehicle is minimized.

8. A steer angle adjusting apparatus according to claim 7, wherein said running condition detecting means includes braking/driving force detcting means for detecting braking and driving forces generated in the vehicle, steer angle detecting means, and side slip angle detecting means for detecting a side slip angle of the vehicle.

9. A steered wheel steer angle adjusting apparatus for a vehicle, comprising:
    steering means including a steering wheel and giving a steer angle to each of the right and left steered wheels of the vehicle through the operation of said steering wheel;
    steer angle adjusting means capable of adjusting the respective steer angles of said right and left steered wheels independently of each other in addition to steering operation of both the wheels by said steering means;
    running condition detecting means for detecting a running condition of the vehicle; and
    control means for controlling said steer angle adjusting means in accordance with the detected running condition during turning of the vehicle.

10. A steered wheel steer angle adjusting apparatus according to claim 9, wherein said control means comprises:
    means for determining the difference between the respective slip angles of said right and left steered wheels; and
    means for controlling said steer angle adjusting means to adjust the steered angles of said right and left steered wheels and for minimizing the difference determined by said determining means.

11. A steered wheel steer angle adjusting apparatus according to claim 9, wherein said control means comprises:
    means for determining the sum of the respective steer angles of said right and left steered wheels; and
    means for controlling said steer angle adjusting means to adjust the steered angles of said right and left steered wheels and for equalizing the sum determined by said determining means and the sum of the steer angles of said right and left steered wheels after the adjustment.

12. A steered wheel steer angle adjusting apparatus according to claim 11, wherein said running condition detecting means includes a vehicle speed sensor for detecting a vehicle speed and a steer angle sensor for detecting a steer angle of each of said steered wheels.

13. A steered wheel steer angle adjusting apparatus according to claim 12, wherein said steer angle sensor includes a steering wheel rotational angle sensor, lower arm rotational angle detecting means, and steer angle adjustment quantity detecting means for detecting a quantity by which a steer angle is adjusted by said steer angle adjusting means.

14. A steered wheel steer angle adjusting apparatus according to claim 13, wherein said steer angle adjusting means is adapted to cause at least one support point of a lower arm supported by the vehicle body at two points spaced apart from each other in the longitudinal direction of the vehicle to move in the substantially lateral direction of the vehicle.

15. A steered wheel steer angle adjusting apparatus according to claim 9, wherein said control means comprises:
means for determining a change in the running condition during turning of the vehicle; and
means for controlling said steer angle adjusting means to change the attitude of the vehicle and for minimizing the change determined by said determining means.

16. A steered wheel steer angle adjusting apparatus according to claim 15, wherein said running condition detecting means includes braking/driving force detecting means for detecting braking and driving forces generated in the vehicle, steer angle detecting means, and side slip angle detecting means for detecting a side slip angle of the vehicle.

17. A steer wheel adjusting apparatus for a vehicle, comprising:
steering means including a steering wheel and giving a steer angle to each of the right and left steered wheels of the vehicle through the operation of said steering wheel;
steer angle adjusting means capable of adjusting the respective steer angles of said right and left steered wheels independently of each other in addition to steering operation of both the wheels by said steering means;
running condition detecting means for detecting a running condition of the vehicle; and
control means including means for determining the difference between respective slip angles of said right and left steered wheel, and means for controlling said steer angle adjusting means in accordance with the detected running condition during turning of the vehicle and for minimizing the differences determined by said determining means.

18. A steer angle adjusting apparatus according to claim 17, wherein said control means comprises:
means for determining the sum of the respective steer angles of said right and left steered wheels; and
means for controlling said steer angle adjusting means to adjust the steered angles of said right and left steered wheels and for equalizing the sum determined by said determining means is equal to the sum of the steer angles of said right and left steered wheels after the adjustment.

19. A steer angle adjusting apparatus according to claim 18, wherein said running condition detecting means includes a vehicle speed sensor for detecting a vehicle speed, a steering wheel rotational angle sensor, lower arm rotational angle detecting means, and steer angle adjustment quantity detecting means for detecting a quantity by which a steer angle is adjusted by said steer angle adjusting means.

20. A steer angle adjusting apparatus according to claim 19, wherein said steer angle adjusting means is adapted to cause at least one support point of a lower arm supported by the vehicle body at two points spaced apart from each other in the longitudinal direction of the vehicle to move in the substantially lateral direction of the vehicle.

* * * * *